United States Patent [19]

Wells

[11] 4,288,128
[45] Sep. 8, 1981

[54] SELF-ALIGNING THRUST BEARING

[75] Inventor: Alan W. Wells, Edelstein, Ill.

[73] Assignee: Caterpillar Tractor Co., Peoria,

[21] Appl. No.: 95,196

[22] PCT Filed: Oct. 1, 1979

[86] PCT No.: PCT/US79/00804

§ 371 Date: Oct. 1, 1979

§ 102(e) Date: Oct. 1, 1979

[87] PCT Pub. No.: WO81/00898

PCT Pub. Date: Apr. 2, 1981

[51] Int. Cl.³ ............................................. F16C 33/74
[52] U.S. Cl. .................................... 308/36.2; 308/135
[58] Field of Search .................. 308/36.2, 36.1, 36.3, 308/140, 156, 9, 161, 135

[56] References Cited

U.S. PATENT DOCUMENTS 4,049,327  9/1977  Goloff et al.
4,073,549  2/1978  Christ et al.

OTHER PUBLICATIONS

Article "Hydraulic Technology . . ." in *Machine Design* of 1-11-79, p. 84ff.

*Primary Examiner*—Lenard A. Footland
*Attorney, Agent, or Firm*—Wegner, Stellman, McCord, Wiles & Wood

[57] ABSTRACT

Self-aligning thrust bearing means (23a, 24a and 26a; 23b, 24b and 26b; or 123a, 124a and 126a; 123b, 124b and 126b) for first (10 and 11; 111) and second (12; 112) relatively rotatable members each includes parts equivalent to the following:

a thin bearing member (26a) between adjacent surfaces (28a and 29a) of the relatively rotatable members; a substantially uniformly axially compressible and extensible peripheral sealing member (24a) sealed to a face of the bearing member (26a) and to the surface (29a) to define a sealed chamber (30a); and liquid filling the chamber so that axial and cocking loads of either of the relatively rotatable members (10 and 11 or 12) may rock the bearing member (26a) without effective axial displacement.

17 Claims, 5 Drawing Figures

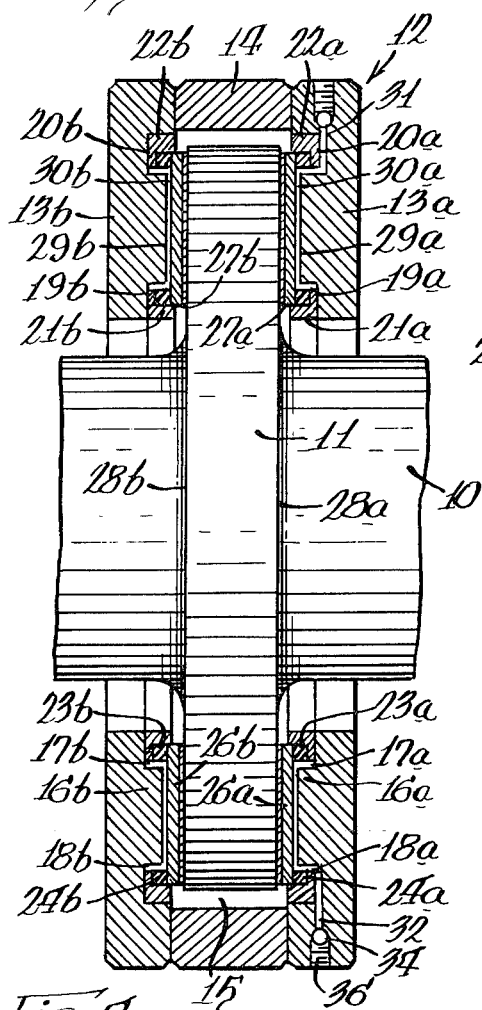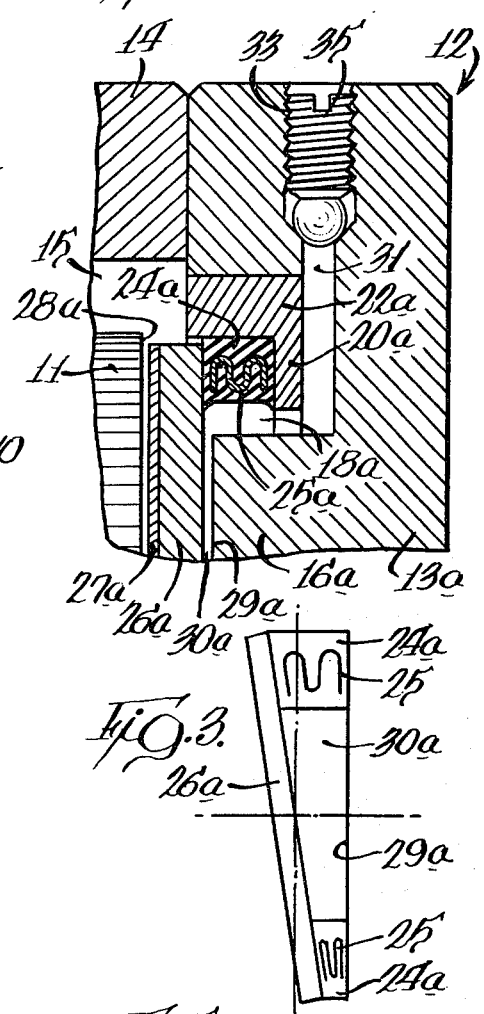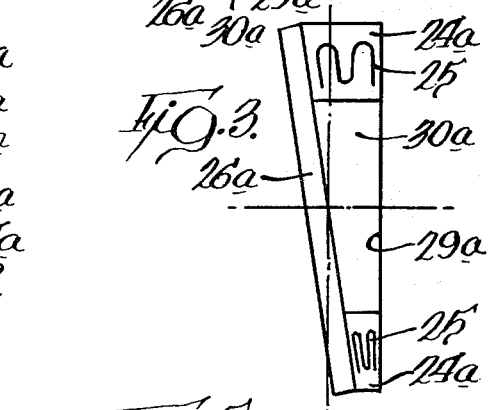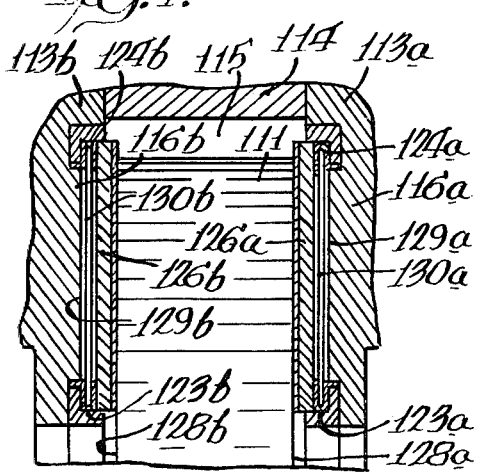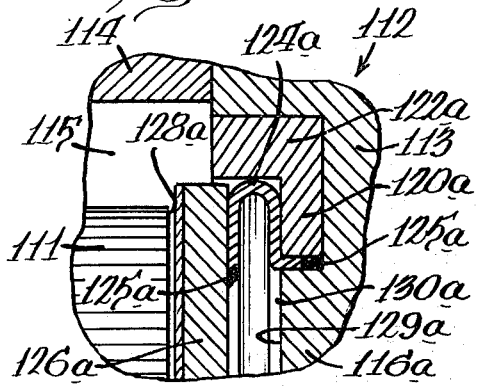

ID=SELF-ALIGNING THRUST BEARING

TECHNICAL FIELD

This invention relates to a thrust bearing which maintains its axial alignment when subjected to cocking loads in addition to thrust loads. It is particularly advantageous in slant axis rotary mechanisms.

BACKGROUND ART

There are various mechanisms in which relatively rotatable members are subjected to thrust loads and also to cocking loads. Typical of such mechanisms are slant axis rotary devices such, for example, as four-cycle, slant axis rotary engines. Such engines may be equipped with thrust bearings of the hydrodynamic type or of the rolling element type.

Oil film thickness in hydrodynamic-type thrust bearings tends to be quite small, usually of the order of a micron or two. Misaligned bearings of this type tend to fail rapidly due to scuffing of the friction surfaces. Bearings of the rolling element type require good alignment to prevent excessive contact stresses from developing due to some rollers carrying more load than others.

The foregoing limitations can be eliminated by building a small amount of flexibility into the bearing supporting structure; but such built-in flexibility unfortunately also permits deflection of the bearing supporting structure producing axial displacement of the center of the bearing.

Axial deflection of slant axis rotary engine thrust bearings is quite harmful because it increases motion of the seals within their grooves and reduces seal life; and in a diesel slant axis rotary engine the motion also reduces the compression ratio.

While the amount of cocking in practice is very small, being only a few minutes of angle, harmful side effects can result in a slant axis rotary engine. Operating on a diesel cycle, the peak pressures are high and the thrust loads are off-center of the rotor and alternate in direction so they first put the shaft in tension and then put it in compression. The eccentricity of the load causes some bending of the shaft, which causes the cocking of the bearing. The severe space limitations require a bearing structure which is axially very compact, but which at the same time is capable of accommodating to cocking action during operation.

The foregoing illustrates limitations of the known prior art. Thus, it is apparent that it would be advantageous to provide an alternative to the prior art.

DISCLOSURE OF INVENTION

The present invention is directed to overcoming one or more of the problems as set forth above.

In one aspect of the present invention, this is accomplished by providing a self-aligning thrust bearing which includes first and second relatively rotatable members, the first of which has a thrust surface and the second of which has a thrust abutment surface facing and very close to the thrust surface. The self-aligning thrust bearing includes a thin bearing member between the thrust surface and the thrust abutment surface, the area of said bearing member being large in proportion to its thickness, together with peripheral sealing means defining a shallow sealed chamber between the bearing member and one of said surfaces, the sealing means being substantially uniformly axially compressible and extensible. Liquid fills the shallow sealed chamber so that axial and cocking loads of either of the relatively rotatable members may rock the bearing member without effective axial displacement during operation of the mechanism.

In the case of a slant axis rotary mechanism the first of the relatively rotatable members is a shaft provided with a thrust collar, and the second of the relatively rotatable members may be a housing in which the shaft is journalled. The opposite surfaces of the thrust collar are both thrust surfaces, and the two walls of the groove are both thrust abutment surfaces; and there are self-aligning thrust bearings between both surfaces of the collar and the two walls of the groove.

THE DRAWINGS

FIG. 1 is a fragmentary sectional view of a slant axis rotary mechanism shaft and housing provided with the self-aligning thrust bearing of the invention;

FIG. 2 is a fragmentary sectional view on an enlarged scale of the upper right-hand corner of FIG. 1;

FIG. 3 is a diagrammatic view of the action of the self-aligning thrust bearing of the present invention, with the angular bearing motion many hundred times larger than it is in actuality;

FIG. 4 is a fragmentary sectional view similar to the upper part of FIG. 1, showing a second embodiment of the invention; and FIG. 5 is a fragmentary sectional view on a greatly enlarged scale, showing the upper right portion of FIG. 4.

BEST MODE FOR CARRYING OUT THE INVENTION

Referring to FIG. 1, the numeral 10 designates a portion of a shaft which is journalled in a housing of a slant axis rotary engine as is well known in the art, and illustrated in such patents as Goloff et al U.S. Pat. No. 4,049,327, issued Sept. 20, 1977, to applicant's assignee. The shaft portion 10 is provided with a circumferential thrust collar 11; and 12 is a bearing supporting structure of the housing in which the shaft portion 10 is journalled. The bearing supporting structure 12 consists of a pair of annular plates 13a and 13b and a spacer ring 14 which are assembled by means of bolts (not shown) to define an annular groove 15 in which the thrust collar 11 is received. The annular plates 13a and 13b are provided with respective confronting annular bosses 16a and 16b which define inner annular channels 17a and 17b and outer annular channels 18a and 18b.

In the respective annular channels 17a and 17b and 18a and 18b are inner peripheral seats 19a and 19b and outer peripheral seats 20a and 20b which have respective integral inner confining walls 21a and 21b and integral outer confining walls 22a and 22b. Inner peripheral sealing means 23a and 23b are bonded to the inner peripheral seats 19a and 19b and confining walls 21a and 21b; and outer peripheral sealing means 24a and 24b are bonded to the outer peripheral seats 20a and 20b and confining walls 22a and 22b. The inner peripheral seals 23a and 23b are identical to the outer peripheral seals 24a and 24b except for their different diameters; and as best seen in FIG. 2 each of them consists of a ring of elastomeric material molded around a metal reinforcing member such as the reinforcing member 25a of FIG. 2. The metal reinforcing members 25a are serpentine in cross section, or bellows-like, with the open sides of the bellows facing radially so that the reinforcing members offer little resistance to axial deformation but offer substantial resistance to radial deformation.

The inner 23a and outer 24a peripheral sealing rings each have one face bonded to a peripheral seat and another face bonded to a confining wall and have a third face bonded to a first thin bearing member 26a which has a surface coating 27a of bearing material in very close spaced relationship to a first thrust surface 28a of the thrust collar 11. Also the inner 23b and outer 24b peripheral sealing rings each have one face bonded to a peripheral seat and another face bonded to a confining wall, and have a third face bonded to a second thin bearing member 26b which has a surface coating 27b of bearing material in very close spaced relationship to a second thrust surface 28b of the thrust collar 11. The inner and outer peripheral sealing means 23a and 23b and 24a and 24b support the respective bearing members 26a and 26b in closely spaced relationship to thrust abutment surfaces 29a and 29b of the bosses 16a and 16b, respectively; and the small spaces between the bearing members 26a and 26b and the thrust abutment surfaces 29a and 29b define respective very shallow chambers 30a and 30b which include the inner annular channels 17a and 17b and the outer annular channels 18a and 18b, and which are sealed by the respective inner and outer peripheral sealing means 23a and 23b and 24a and 24b.

A filling bore 31 communicates with one side of the annular channel 18a, while a vent bore 32 communicates with the opposite side of said channel; and the bores have respective threaded counterbores 33 and 34 which receive, respectively, a fill plug 35 and a vent plug 36. The shallow sealed chambers 30a and 30b are filled with liquid such, for example, as lubricating oil or hydraulic system fluid. There are filling bores 31 and vent bores 32 communicating with both of the shallow sealed chambers 30a and 30b; but for simplicity of illustration the bores are shown only at the right side of FIG. 1.

As seen schematically in FIG. 3, when a load is applied to the shaft 10 or to the component which includes the mounting means 12, any cocking moment of that load may rock the bearing member 26a and its counterpart 26b without effective axial displacement of the bearing member relative to the shaft 10 or relative to the member in which the supporting means 12 is mounted. The fluid volume remains constant, with one side of the peripheral sealing means 24a and 24b being compressed while the other side is extended. As previously indicated, the actual rocking movement of the bearing member 26a is no more than a few minutes of angle.

Referring now to FIGS. 4 and 5, a second embodiment of the invention is like the first embodiment above described except for the structure of the peripheral sealing means. The second embodiment is illustrated without a charging conduit 31, although such a conduit may be provided if desired. As seen in FIGS. 4 and 5, a thrust collar 111 is received between annular plates 113a and 113b which are separated by a spacer ring 114 to define an annular groove 115. Bosses 116a and 116b on the inner surfaces of the annular plates 113a and 113b have respective thrust abutment surfaces 129a and 129b; while opposite faces of the thrust collar 111 provide thrust surfaces 128a and 128b. Thin bearing members 126a and 126b are supported upon respective inner peripheral sealing means 123a and 123b and outer peripheral sealing means 124a and 124b. Each of the sealing means 124a and 124b is in the form of a single convolution metallic bellows which is axially shallow and radially deep so as to be relatively flexible in the axial direction and relatively stiff in the radial direction. As seen in FIG. 5, the peripheral sealing means 124a has a first margin welded at 125a between the boss 116a and a peripheral seat 120a, and has a second margin welded at 125a to the thin bearing member 126a; and said peripheral sealing means 124a is confined by a wall 122a. Each of the peripheral sealing means 123a and 123b and 124b is identical to the sealing means 124a, and is welded in precisely the same way between the adjacent boss and a peripheral seat, and to a thin bearing member 126a or or 126b. Sealed chambers 130a and 130b are filled with liquid such as lubricating oil or hydraulic system fluid.

INDUSTRIAL APPLICABILITY

It is believed apparent from the foregoing detailed description that, in operation, the thrust bearing means 23a, 24a, 26a and 23b, 24b, 26b receive axial and cocking loads either of the shaft 10 or of the member in which the supporting structure 12 is mounted, without effective axial displacement of the bearing means. This is particularly important in slant axis rotary mechanisms. The thrust bearing means may be used either in the bearing assembly 46 of U.S. Pat. No. 4,049,327, or at the thrust collar 26.

It is apparent that if the invention is applied to a mechanism which does not have a thrust collar received in a groove, only an outer peripheral sealing means such as the sealing means 24a will be required, with a single circular bearing member supported upon the single sealing means.

The foregoing detailed description has been given for clearness of understanding only and no unnecessary limitations should be understood therefrom as modifications will be obvious to those skilled in the art.

I claim:

1. In a mechanism which includes first (10 and 11; 111) and second (12; 112) relatively rotatable members, the first of said members having a thrust surface (28a; 128a) and the second of said members having a thrust abutment surface (29a; 129a) facing and very close to said thrust surface (28a; 128a), self-aligning thrust bearing means (24a–26a; 124a–126a) comprising in combination:

a thin bearing member (26a; 126a) between said thrust surface (28a; 128a) and said thrust abutment surface (29a; 129a), the area of said bearing member (26a; 126a) being large in proportion to its thickness;

peripheral sealing means (24a; 124a) in sealing relationship with a face of said bearing member (26a; 126a) and with one (28a or 29a; 128a or 129a) of said surfaces to define a shallow sealed chamber (30a; 130a) between said bearing member (26a; 126a) and said one (28a or 29a; 128a or 129a) of said surfaces, said sealing means (24a, 124a) being substantially uniformly axially compressible and extensible;

and liquid filling said shallow sealed chamber (30a; 130a) so that axial and cocking loads of either of said relatively rotatable members (10 and 11 or 12; 111 or 112) may rock the bearing member (26a; 126a) without effective axial displacement during operation of the mechanism.

2. The combination of claim 1 which includes means (31, 35) for admitting liquid to the shallow sealed chamber (30a) and means (32, 36) for venting gas therefrom.

3. The combination of claim 1 in which the peripheral sealing means (24a; 124a) is constructed and arranged to be highly resistant to radial deflection.

4. The combination of claim 1 which includes a peripheral seat (20a; 120a) operatively associated with said one (28a or 29a; 128a or 129a) of said surfaces and a confining wall (22a; 122a) surrounding said seat, the peripheral sealing means (24a; 124a) being fixed to said seat (20a; 120a) and confined by said wall (22a; 122a).

5. The combination of claim 4 in which the peripheral sealing means comprises a ring (24a) of elastomeric material which has a first surface bonded to the peripheral seat (20a), a second surface abutting the confining wall (22a), and a third surface bonded to the bearing member (26a).

6. The combination of claim 5 in which the ring (24a) of elastomeric material is molded around a reinforcing member (25a) which is shaped to offer little resistance to axial deformation and to offer substantial resistance to radial deflection.

7. The combination of claim 6 in which the reinforcing member (25a) is serpentine in cross section.

8. The combination of claim 4 in which the peripheral sealing means comprises a single convolution metallic bellows (124a) which is axially shallow and radially deep so as to be relatively flexible in the axial direction and relatively stiff in the radial direction, a first weld (125a) securing one margin of said bellows (124a) to the peripheral seal (120a) and a second weld (125a) securing the other margin of said bellows (124a) to the bearing member (126a).

9. The combination of claim 1 in which the peripheral sealing means comprises a metallic bellows (25a; 124a) which is axially relatively flexible and radially relatively stiff, and means (24a; 125a) sealing said bellows (25a; 124a) to the bearing member (26a; 126a) and in operative relationship to said one (28a or 29a; 128a or 129a) of said surfaces.

10. The combination of claim 9 in which the means sealing the bellows (25a) comprises a ring (24a) of elastomeric material in which the bellows is embedded, and means bonding said ring to the bearing member (26a) and to said one (28a or 29a) of said surfaces.

11. The combination of claim 10 which includes a confining wall (22a) embracing the ring.

12. The combination of claim 9 in which the metallic bellows (124a) has a single convolution, and the means sealing the bellows comprises a first weld (125a) securing one margin of said bellows in operative relationship to said one (128a or 129a) of said surfaces and a second weld (125a) securing the other margin of said bellows to the bearing member (126a).

13. The combination of claim 12 which includes a confining wall (122a) embracing the bellows (124a).

14. The combination of claim 1 in which the first relatively rotatable member is a shaft having a thrust collar (11; 111), the thrust surface (28a; 128a) is one surface of said thrust collar (11; 111), the thrust abutment surface (29a; 129a) is one surface of an annular groove (15; 115) in the second relatively rotatable member (12; 112) in which said thrust collar (11; 111) is received, said bearing member (26a; 126a) is annular, said peripheral sealing means (24a; 124a) is at the outer periphery of said bearing member (26a; 126a), there is a substantially uniformly axially compressible and extensible inner peripheral sealing means (23a; 123a) in sealing relationship with the inner periphery of said face of said bearing member (26a; 126a) and with said one (28a or 29a, 128a or 129a) of said surfaces and defining a side of said shallow sealed chamber (30a; 130a), the opposite surface of said thrust collar defines a second thrust surface (28b; 128b), a second surface of said annular groove (15; 115) defines a second thrust abutment surface (29b; 129b), there is a second annular bearing member (26b; 126b) between said second thrust surface (28b; 128b) and second thrust abutment surface (29b; 129b), a second peripheral sealing means (24b; 124b) in sealing relationship with the outer periphery of said second bearing member (26b; 126b) and with one of said second surfaces (28b or 29b; 128b or 129b), there is a second inner peripheral sealing means (23b; 123b) in sealing relationship with the inner periphery of said second annular bearing member (26b; 126b) and cooperating with said second peripheral seal means (24a; 124a) to define a second shallow sealed chamber (30b; 130b) between said second bearing member (26b; 126b) and said one (28b or 29b; 128b or 129b) of said second surfaces, said second peripheral sealing means (24b; 124b) and said second inner peripheral sealing means (23b; 123b) being substantially uniformly axially extensible and compressible, and liquid filling said second shallow sealed chamber (30b; 130b), so that axial and cocking loads of either of said relatively rotatable members (10 & 11; or 12; 111 or 112) rock the two annular bearing members (26a and 26b, 126a and 126b) without effective axial displacement of either bearing member during operation of the mechanism.

15. The combination of claim 14 in which both the peripheral sealing means (24a & 24b; 124a & 124b), and both the inner peripheral sealing means (23a & 23b; 123a & 123b) are constructed and arranged to be highly resistant to radial deflection.

16. The combination of claim 15 which includes first (22a; 122a) and second (22b; 122b) outer confining walls embracing, respectively, said first (24a; 124a) and second (24b; 124b) peripheral sealing means, and first (21a; 121a) and second (21b; 121b) inner confining walls abutting and confining said first (23a; 123a) and second (23b; 123b) inner peripheral sealing means.

17. The combination of claim 14 in which each peripheral sealing means (24a, 24b; 124a, 124b) and each inner peripheral sealing means (23a, 23b, 123a, 123b) is in sealing relationship with one of the thrust abutment surfaces (29a or 29b; 129a or 129b).

* * * * *